Patented May 28, 1929.

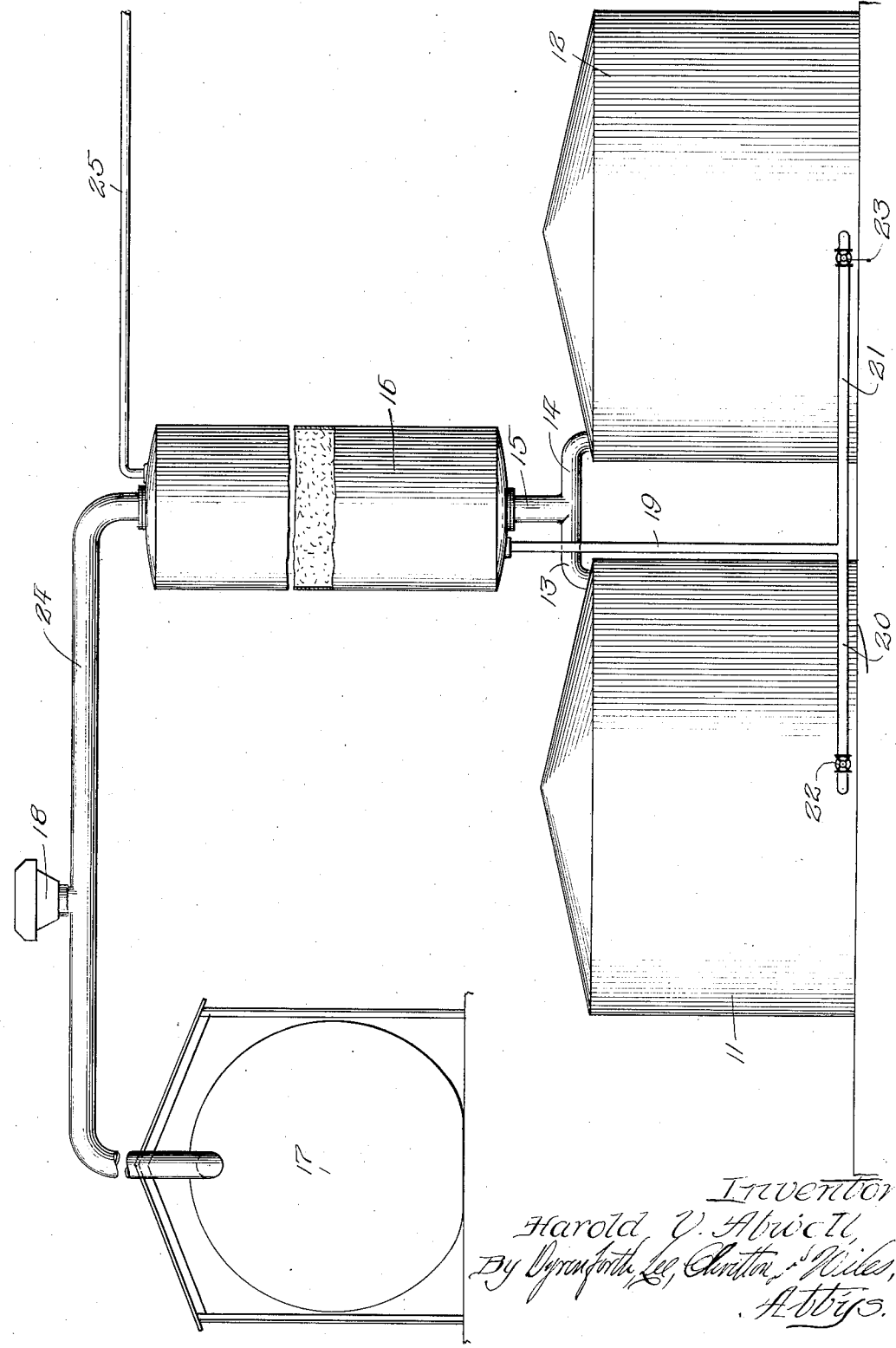

1,715,112

UNITED STATES PATENT OFFICE.

HAROLD V. ATWELL, OF WHITING, INDIANA, ASSIGNOR TO STANDARD OIL COMPANY, OF WHITING, INDIANA, A CORPORATION OF INDIANA.

PREVENTION OF LOSS BY EVAPORATION.

Application filed November 25, 1925. Serial No. 71,501.

This invention relates to the prevention of evaporation losses from storage or collection tanks for volatile petroleum fractions such as gasoline, or crude oil or distillates containing such volatile substances.

In practice, such tanks are of substantial dimensions and are exposed to considerable variations of temperature, particularly due to solar heat which may heat the vapors above the surface of the liquid in the tanks to a comparatively high temperature during the day, with a substantial cooling and consequent retraction during the night. Particularly when the tanks are only partly filled, is developed a "breathing" of very substantial proportions. Again when oil is fed into the tanks a corresponding displacement of vapors takes place which may entail considerable loss of the most valuable volatile fractions.

According to Patent No. 1,596,385, issued August 17, 1926, on the application of Robert E. Wilson, such losses are minimized or avoided by the use of breather bags which collect the expelled vapors and from which they are returned to the tanks when the vapor pressure therein falls again, for example, due to the nightly cooling of the vapors in the tank.

The present invention minimizes the loss of valuable vapors from the tanks and results in considerable saving of volatile constituents, or where breather bags are used, permits the breather bag equipment to be reduced in capacity and consequently in expense.

It is almost invariably the case that the oil or distillate being fed into the tanks is substantially cooler than the vapors therein. For example, oil in pipe lines will rarely exceed 100° F. while tank vapors will often attain 130° to 150° F. Again in a refinery, distillate may be fed into the tank at about 68° F. while the vapors in the tank will readily attain 100° or higher in the sun. The present invention utilizes the cold incoming oil to scrub and cool the vapors and to abstract condensible portions therefrom. For this purpose the incoming oil is passed downwardly through a scrubbing tower through which the vapors must pass to the open air or the breather bag as the case may be.

The invention is illustrated diagrammatically and by way of example, in the accompanying drawing, in which 11 and 12 are storage tanks; 13 and 14 are vapor outlets from the top of the tanks and communicate through the pipe 15 with the lower end of a suitable scrubber 16, which may be constructed as a packed tower or of other suitable form. The vapor outlet 24 from the top of the scrubber 16 may be connected to a breather bag 17 as described in the patent application above referred to and is provided with a seal 18 to relieve any excessive pressure, either within or without the tank system. A seal suitable for this purpose is described in my U. S. Patent No. 1,553,844, granted September 15, 1925. The incoming oil is fed to the top of the scrubber 16 by pipe 25 and is led from the bottom thereof by pipe 19 from which it is conducted to one or another of the storage tanks 11 and 12 by pipes 20 and 21 provided with valves 22 and 23 to direct the incoming oil into either tank at will.

While two tanks have been shown in the example, it must be understood that the invention is not limited in this respect and that a single or a greater number of tanks may be combined with a scrubber in the same manner. The invention is particularly useful in its application to a plurality or group of tanks, of which at least one is receiving frequent or continuous supplies of oil, for example, pipe line tanks and run-down tanks. In such a case the vapor space of each tank is connected with a common scrubber and the oil directed into one of the tanks in the same way as described in connection with the tanks 11 and 12. In this way the incoming oil is utilized to scrub the gases issuing from the tank into which the oil is being fed, and also the gases issuing from each of the group of tanks.

The nature of the scrubber is unimportant provided it affords free flow for the incoming oil and ensures intimate contact and temperature exchange between the oil and vapors therein.

By the present invention the loss of valuable volatile vapors is diminished, the same being absorbed to a considerable extent by the incoming fresh oil.

I claim:

1. In combination a tank for storing oil containing volatile constituents, a scrubber, a vapor outlet from said tank communicating to the vapor inlet of said scrubber, whereby vapors discharged from the tanks are caused to pass through said scrubber, and means for passing oil through said scrubber in contact with said vapors and into said tank.

2. In combination a tank for storing oil containing volatile constituents, a scrubber, a pipe connecting the vapor space of said tank to the vapor inlet of said scrubber, whereby vapors discharged from the tank are caused to pass through said scrubber, means for passing oil through said scrubber in contact with said vapors, means for conducting oil from said scrubber to said tank, a breather bag, a pipe communicating from the vapor outlet of said scrubber to said breather bag and an excess pressure relief valve communicating with the vapor space of the tank.

3. In combination a plurality of tanks for storing oil containing volatile constituents, a scrubber, vapor outlets from said tanks communicating with the vapor inlet of said scrubber, whereby vapors discharged from the tanks are caused to pass through said scrubber, means for passing oil through said scrubber in contact with said vapors and means for conducting said oil from the scrubber to a selected one of said tanks.

4. The method of preventing loss by evaporation from tanks for storing oil containing volatile fractions, which consists in passing oil into a tank through a scrubber and conducting vapors from said tanks through said scrubber in counter-current to the incoming oil.

5. In combination, a tank for storing oil containing volatile constituents, a scrubber, a pipe connecting the vapor space of said tank to the vapor inlet of said scrubber, whereby vapors discharged from the tank are caused to pass through said scrubber, means for passing oil through said scrubber in contact with said vapors, means for conducting oil from said scrubber to said tank, a breather bag, and a pipe communicating from the vapor outlet of said scrubber to said breather bag.

HAROLD V. ATWELL.